US006250653B1

(12) United States Patent
Worrell

(10) Patent No.: US 6,250,653 B1
(45) Date of Patent: Jun. 26, 2001

(54) CARRIAGE FOR SEATING MULTIPLE CHILDREN

(76) Inventor: Dale W. Worrell, P.O. Box 17461, Seattle, WA (US) 98107

(*) Notice: Subject to any disclaimer, the term of this patent is extended or adjusted under 35 U.S.C. 154(b) by 0 days.

(21) Appl. No.: 09/436,737

(22) Filed: Nov. 9, 1999

(51) Int. Cl.$^7$ ....................................................... B62B 7/00
(52) U.S. Cl. ........................ 280/47.38; 280/47.4; 280/647
(58) Field of Search ............................... 280/47.38, 47.19, 280/47.4, 647, 650, 657, 658; 297/232, 244

(56) References Cited

U.S. PATENT DOCUMENTS

| 53,842 | * | 4/1866 | Lockwood et al. | 297/232 |
|---|---|---|---|---|
| 3,223,431 | * | 12/1965 | Gottfried et al. | 280/47.38 |
| 4,422,658 | * | 12/1983 | Hilliard | 280/47.4 |
| 4,555,121 | * | 11/1985 | Lockard et al. | 280/30 |
| 5,033,761 | * | 7/1991 | Kelly | 280/47.38 |
| 5,263,730 | * | 11/1993 | Roach et al. | 280/47.4 |
| 6,022,042 | * | 2/2000 | Hartenstine | 280/642 |
| 6,056,306 | * | 5/2000 | Rust et al. | 280/204 |

* cited by examiner

Primary Examiner—Brian L. Johnson
Assistant Examiner—Tony Winner
(74) Attorney, Agent, or Firm—Richard L. Miller, P.E.

(57) ABSTRACT

A carriage for seating multiple children that includes a frame, a seating assembly disposed on the frame, and a wheel assembly rotatably mounted to the frame. The seat assembly comprises a pair of guard rails, a plurality of cross member rails that form arm rests for the multiple children sitting on the seat portion and further divide each guard rail into multiple sections, and a plurality of seat backs. One half of the plurality of seat backs extend upwardly from one long peripheral end of the seat portion to past alternating sections of one guard rail for providing seat backs for one half of the multiple children, and the other half of the plurality of seat backs extend upwardly from the other long peripheral end of the seat portion to past alternating sections of the other guard rail and face the alternating sections of the one guard rail not having the seat backs thereon for providing seat backs for the other half of the multiple children and together with the one half of the seat backs form in-line seating for the multiple children while they sit adjacent to each other, but face in opposite directions, with the one half of the multiple children staggered between and facing oppositely to the other half of the multiple children.

15 Claims, 1 Drawing Sheet

CARRIAGE FOR SEATING MULTIPLE CHILDREN

BACKGROUND OF THE INVENTION

1. Field of the Invention

The present invention relates to a carriage. More particularly, the present invention relates to a carriage for seating multiple children.

2. Description of the Prior Art

Numerous innovations for carriages have been provided in the prior art that will be described. Even though these innovations may be suitable for the specific individual purposes to which they address, however, they differ from the present invention.

Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a carriage for seating multiple children that avoids the disadvantages of the prior art.

ANOTHER OBJECT of the present invention is to provide a carriage for seating multiple children that is simple and inexpensive to manufacture.

STILL ANOTHER OBJECT of the present invention is to provide a carriage for seating multiple children that is simple to use.

BRIEFLY STATED, YET ANOTHER OBJECT of the present invention is to provide a carriage for seating multiple children that includes a frame, a seating assembly disposed on the frame, and a wheel assembly rotatably mounted to the frame. The seat assembly comprises a pair of guard rails, a plurality of cross member rails that form arm rests for the multiple children sitting on the seat portion and further divide each guard rail into multiple sections, and a plurality of seat backs. One half of the plurality of seat backs extend upwardly from one long peripheral end of the seat portion to past alternating sections of one guard rail for providing seat backs for one half of the multiple children, and the other half of the plurality of seat backs extend upwardly from the other long peripheral end of the seat portion to past alternating sections of the other guard rail and face the alternating sections of the one guard rail not having the seat backs thereon for providing seat backs for the other half of the multiple children and together with the one half of the seat backs form in-line seating for the multiple children while they sit adjacent to each other, but face in opposite directions, with the one half of the multiple children staggered between and facing oppositely to the other half of the multiple children.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1:
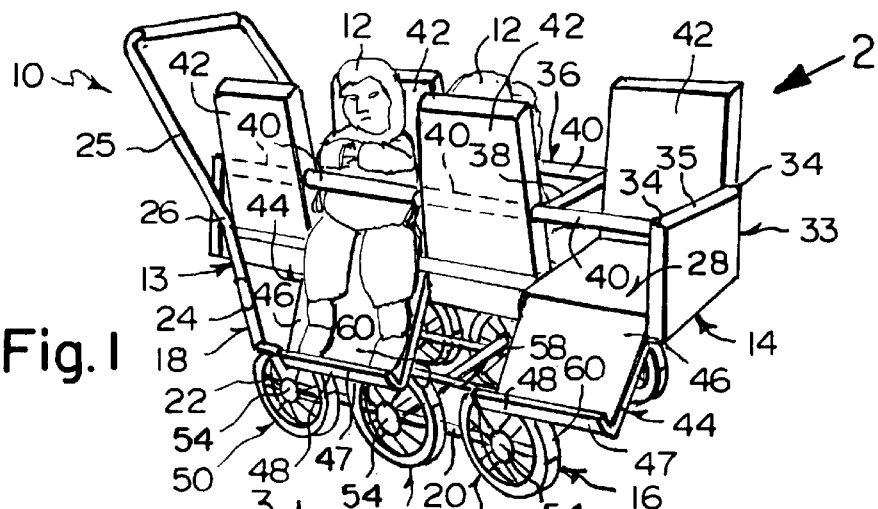
FIG. 1 is a diagrammatic perspective view of the present invention in use.
Figure 2:
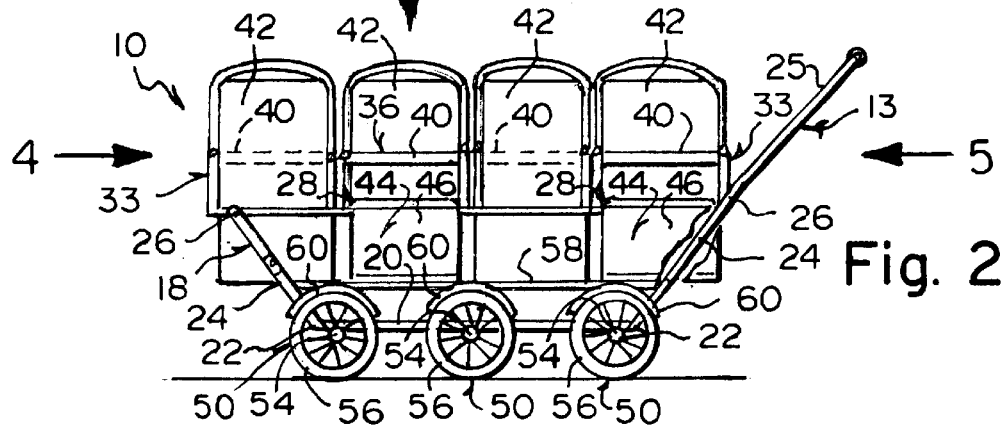
FIG. 2 is a diagrammatic side elevational view taken generally in the direction of arrow 2 in FIG. 1 of the present invention.
Figure 3:
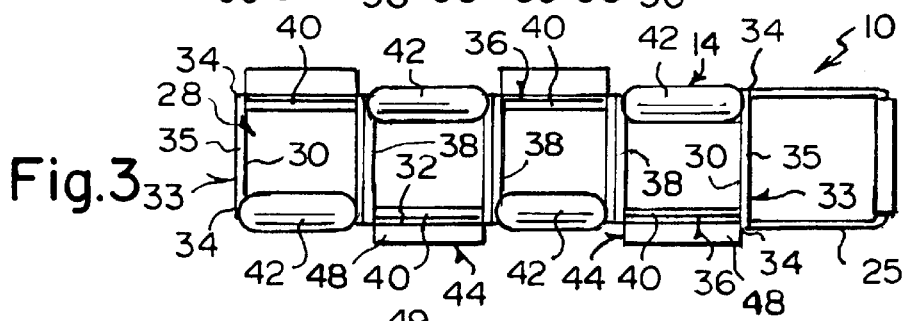
FIG. 3 is a diagrammatic top plan view taken generally in the direction of arrow 3 in FIG. 2.
Figures 4, 5:
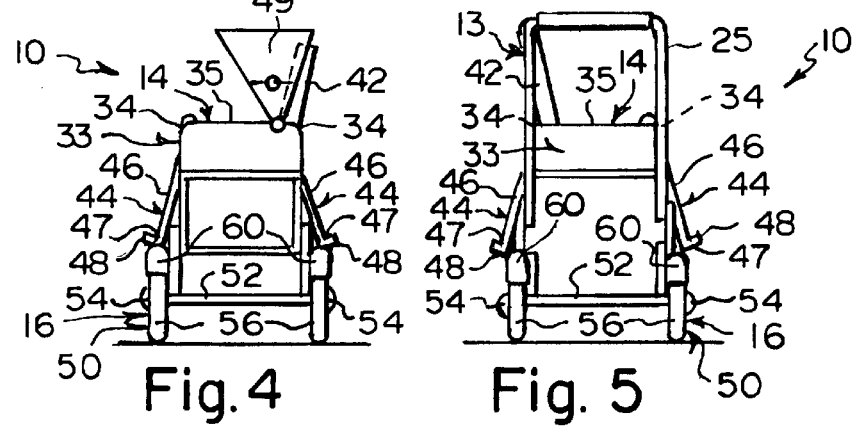
FIG. 4 is a diagrammatic front end view taken generally in the direction of arrow 4 in FIG. 2.
FIG. 5 is a diagrammatic front end view taken generally in the direction of arrow 5 in FIG. 2.

LIST OF REFERENCE NUMERALS UTILIZED IN THE DRAWING 10 carriage of the present invention
12 multiple children
13 frame
14 seating assembly
16 wheel assembly
18 pair of side rails of frame 13
20 center portion of each side rail of pair of side rails 18 of frame 13
22 pair of terminal ends of center portion 20 of each side rail of pair of side rails 18 of frame 13
24 pair of terminal portions of each side rail of pair of side rails 18 of frame 13
25 inverted U-shaped handle of frame 13
26 terminal end of each terminal portion of pair of terminal portions 24 of each side rail of pair of side rails 18 of frame 13
28 seat portion of seat assembly 14
30 pair of short peripheral ends of seat portion 28 of seat assembly 14
32 pair of long peripheral ends of seat portion 28 of seat assembly 14
33 pair of end walls of seat assembly 14
34 pair of terminal ends of terminal edge 35 of each end wall of pair of end walls 30 of seat assembly 14
35 terminal edge of each end wall of pair of end walls 30 of seat assembly 14
36 pair of guard rails of seat assembly 14
38 plurality of cross member rails of seat assembly 14
40 multiple sections of each guard rail of pair of guard rails 36 of seat assembly 14
42 plurality of seat backs of seat assembly 14
44 plurality of foot rests of seat assembly 14
46 first planar portion of each foot rest of plurality of foot rests 44 of seat assembly 14
47 terminal edge of first planar portion 46 of each foot rest of plurality of foot rests 44 of seat assembly 14
48 second planar portion of each foot rest of plurality of foot rests 44 of seat assembly 14
49 plurality of folding canopies of seat assembly 14
50 plurality of tandem wheel assemblies of wheel assembly 16
52 axle of each tandem wheel assembly of plurality of tandem wheel assemblies 50 of wheel assembly 16
54 pair of terminal ends of axle 52 of each tandem wheel assembly of plurality of tandem wheel assemblies 50 of wheel assembly 16
56 pair of wheels of each tandem wheel assembly of plurality of tandem wheel assemblies 50 of wheel assembly 16

58 pair of fender support struts of wheel assembly 16
60 plurality of fenders of wheel assembly 16

DESCRIPTION OF THE PREFERRED EMBODIMENT

Referring now to the figures, in which like numerals indicate like parts, and particularly to FIG. 1, the carriage of the present invention is shown generally at 10 for seating multiple children 12.

The overall configuration of the carriage 10 can best be seen in FIG. 1, and as such, will be discussed with reference thereto.

The carriage 10 comprises a frame 13, a seating assembly 14 disposed on the frame 13, and a wheel assembly 16 rotatably mounted to the frame 13.

The specific configuration of the frame 13, the seating assembly 14, and the wheel assembly 16 can best be seen in FIGS. 1–5, and as such, will be discussed with reference thereto.

The frame 13 comprises a pair of side rails 18 that are slender, elongated, and spaced parallel from each other.

Each side rail 18 of the frame 13 has a center portion 20 that is straight, horizontally-oriented, and has a pair of terminal ends 22.

Each side rail 18 of the frame 13 further has a pair of terminal portions 24. Each terminal portion 24 of each rail 18 extends skewly upwardly and outwardly from an associated terminal end 22 of the center portion 20 of an associated side rail 18, to a terminal end 26.

The frame 13 further comprises an inverted U-shaped handle 25 that extends upwardly and collinearly from the terminal end 26 of a pair of adjacent terminal portions 24 of the pair of side rails 18.

The inverted U-shaped handle 25 of the frame 13 is padded for comfort when pushing the carriage 10.

The seat assembly 14 comprises a seat portion 28 that is horizontally-oriented, planar, and extends springy from the terminal end 26 of one terminal portion 24 of one side rail 18 and the terminal end 26 of one terminal portion 24 of the other side rail 18, springy to the other terminal end 26 of the other terminal portion 24 of the one side rail 18 and the other terminal end 26 of the other terminal portion 24 of the other side rail 18 so as to form a pair of short peripheral ends 30 and a pair of long peripheral ends 32 that are longer than the pair of short peripheral ends 30 and are spaced above, and run in a same direction as, the pair of side rails 18 of the frame 13, with the springiness providing comfort for the multiple children 12 sitting thereon.

The seat portion 28 of the seat assembly 14 is padded for comfort of the multiple children 12 seated thereon.

The seat assembly 14 further comprises a pair of end walls 33 that are planar. Each end wall 33 of the seat assembly 14 extends vertically upwardly from an associated short peripheral end 30 of the set portion 28, to a terminal edge 32 that has a pair of terminal ends 34.

The seat assembly 14 further comprises a pair of guard rails 36 that are slender, elongated, and spaced horizontally from each other. Each guard rail 36 of the seat portion 14 extends horizontally from an associated terminal end 34 of the terminal edge 35 of one end wall 30, to an associated terminal end 34 of the terminal edge 35 of the other end wall 30, and is spaced above, and runs in a same direction as, the pair of long terminal ends 32 of the seat portion 28, and with the spacing providing space for the legs of the multiple children 12 to pass through when seated on the seat portion 28.

The pair of guard rails 36 of the seat assembly 14 are padded for comfort of the multiple children 12 leaning forwardly thereon.

The seat assembly 14 further comprises a plurality of cross member rails 38 that are slender, elongated, parallel spaced apart from each other, extend horizontally from one guard rail 36 of the seat assembly 14 horizontally to the other guard rail 36 of the seat assembly so as to form arm rests for the multiple children 12 sitting on the seat portion 28, and further divide each guard rail 36 of the seat assembly 14 into multiple sections 40.

The seat portion 28, the pair of end walls 33, the pair of guard rails 36, and the cross members 38 form a rectangular-parallelepiped-shaped box that provides rigid protection for the multiple children 12 seated therein.

The seat assembly 14 further comprises a plurality of seat backs 42 that are spaced-apart from each other.

One half of the plurality of seat backs 42 of the seat assembly 14 extend upwardly from one long peripheral end 32 of the seat portion 28 to past alternating sections 40 of one guard rail 36 of the seat assembly 14 for providing seat backs for one half of the multiple children 12.

The other half of the plurality of seat backs 42 of the seat assembly 14 extend upwardly from the other long peripheral end 32 of the seat portion 28 to past alternating sections 40 of the other guard rail 36 of the seat assembly 14 and facing the alternating sections 40 of the one guard rail 36 of the seat assembly 14 not having the seat backs 42 thereon for providing seat backs for the other half of the multiple children 12 and together with said one half of said seat backs 42 of seat assembly 14 form in-line seating for the multiple children 12 while they sit adjacent to each other, but face in opposite directions, with the one half of the multiple children 12 staggered between and facing oppositely to the other half of the multiple children 12.

The plurality of seat backs 42 of the seat assembly 14 are padded for comfort of the multiple children 12 leaning back thereon.

The seat assembly 14 further comprises a plurality of foot rests 44 that depend skewly outwardly form the pair of long peripheral ends 32 of the seat portion 28, and are disposed adjacently to the seat backs 42 of the seat portion 14.

Each foot rest 44 of the seat assembly comprises a first planar portion 46 that depends skewly outwardly from an associated long peripheral end 32 of the seat portion 28, to a terminal edge 47.

Each foot rest 44 of the seat assembly further comprises a second planar portion 48 that extends perpendicularly outwardly from the terminal edge 47 of, and is shorter than, an associated first planar portion 46.

The seat assembly 14 further comprises a plurality of folding canopies 49 that extend from the plurality of seat backs of the seat assembly 14, respectively.

The wheel assembly 16 comprises a plurality of tandem wheel assemblies 50 that are spaced-apart from each other on the pair of side rails 18 of the frame 13.

Each tandem wheel assembly 50 of the wheel assembly 16 comprises an axle 52 that extends rotatably from and past one side rail 18 of the frame 13 horizontally to and past the other side rail 18 of the frame 14, and has a pair of terminal ends 54.

Each tandem wheel assembly 50 of the wheel assembly 16 further comprises a pair of wheels 56 that are disposed on the terminal ends 54 of the axle 52, respectively, outboard of the pair of side rails 18 of the frame 13.

The wheel assembly 16 further comprises a pair of fender support struts 48 that are horizontally spaced-apart and form a foot rest for older children having longer legs, when foot rest 44 of seat assembly is not present.

Each fender support strut 58 of the wheel assembly 16 extends across the pair of terminal portions 24 of an associated side rail 18 of the frame 13, in a same direction as the center portion 20 of the associated side rail 18 of the frame 13, and is spaced above the wheels 56 of the wheel assembly 16.

The wheel assembly 16 further comprises a plurality of fenders 60 that depend from the pair of fender support struts 58 of the wheel assembly 16, and over an associated wheel 56 of the wheel assembly 16.

It will be understood that each of the elements described above, or two or more together, may also find a useful application in other types of constructions differing from the types described above.

While the invention has been illustrated and described as embodied in a carriage for seating multiple children, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. A carriage for seating multiple children, comprising:
    a) a frame;
    b) a seating assembly disposed on said frame; and
    c) a wheel assembly rotatably mounted to said frame, wherein said frame comprises a pair of side rails that are slender, elongated, and spaced parallel from each other, wherein each side rail of said frame has a center portion that is straight, horizontally-oriented, and has a pair of terminal ends, wherein each side rail of said frame further has a pair of terminal portions, wherein each terminal portion of each rail extends skewly upwardly and outwardly from an associated terminal end of said center portion of an associate side rail, to a terminal end, wherein said seat assembly comprises a seat portion that is horizontally-oriented, planar, and extends springy from said terminal end of one terminal portion of one side rail and said terminal end of one terminal portion of the other side rail, springy to the other terminal end of the other terminal portion of said one side rail and the other terminal end of the other terminal portion of said other side rail so as to form a pair of short peripheral ends and a pair of long peripheral ends and are spaced above, and run in a same direction as, said pair of side rails of said frame, with springiness providing comfort for the multiple children sitting, wherein said seat assembly further comprises a pair of end walls that are planar, wherein each end wall of said seat assembly extends vertically upwardly from an associated short peripheral end of said seat portion, to a terminal edge that has a pair of terminal ends, wherein said seat assembly further comprises a pair of guard rails that are slender, elongated, and spaced horizontally from each other, wherein said seat assembly further comprises a plurality of cross member rails that are slender, elongated, parallel spaced apart from each other, extend horizontally from one guard rail of said seat assembly horizontally to the other guard rail of said seat assembly so as to form arm rests for the multiple children sitting on said seat portion, and further divide each guard rail of said seat assembly into multiple sections.

2. The carriage as defined in claim 1, wherein said seat portion, said pair of end walls, said pair of guard rails, and said cross members form a rectangular-parallelepiped-shaped box that provides rigid protection for the multiple children seated therein.

3. The carriage as defined in claim 1, wherein said seat assembly further comprises a plurality of seat backs that are spaced-apart from each other.

4. The carriage as defined in claim 3, wherein one half of said plurality of seat backs of said seat assembly extend upwardly from one long peripheral end of said seat portion to past alternating sections of one guard rail of said seat assembly for providing seat backs for one half of the multiple children.

5. The carriage as defined in claim 4, wherein the other half of said plurality of seat backs of said seat assembly extend upwardly from the other long peripheral end of said seat portion to past alternating sections of the other guard rail of said seat assembly and facing said alternating sections of said one guard rail of said seat assembly not having said seat backs thereon for providing seat backs for the other half of the multiple children and together with said one half of said seat backs of said seat assembly form in-line seating for the multiple children while they sit adjacent to each other, but face in opposite directions, with the one half of the multiple children staggered between and facing oppositely to the other half of the multiple children.

6. The carriage as defined in claim 3, wherein said plurality of seat backs of said seat assembly are padded for comfort of the multiple children leaning back thereon.

7. The carriage as defined in claim 3, wherein said seat assembly further comprises a plurality of foot rests that depend skewly outwardly from said pair of long peripheral ends of said seat portion, and are disposed adjacently to said seat backs of said seat portion.

8. The carriage as defined in claim 7, wherein each foot rest of said seat assembly comprises a first planar portion that depends skewly outwardly from an associated long peripheral end of said seat portion, to a terminal edge.

9. The carriage as defined in claim 8, wherein each foot rest of said seat assembly further comprises a second planar portion that extends perpendicularly outwardly from said terminal edge of, and is shorter than, an associated first planar portion.

10. The carriage as defined in claim 3, wherein said seat assembly further comprises a plurality of folding canopies that extend from the plurality of seat backs of the seat assembly, respectively.

11. The carriage as defined in claim 1, wherein said frame further comprises an inverted U-shaped handle that extends upwardly and collinearly from said terminal end of a pair of adjacent terminal portions of said pair of side rails.

12. The carriage as defined in claim 11, wherein said inverted U-shaped handle of said frame is padded for comfort when pushing said carriage.

13. The carriage as defined in claim 1, wherein each guard rail of said seat portion extends horizontally from an associated terminal end of said terminal edge of one end wall, to an associated terminal end of said terminal edge of the other end wall, and is spaced above, and runs in a same direction as, said pair of long terminal ends of said seat portion, and with said spacing providing space for the legs of the multiple children to pass through when seated on said seat portion.

14. The carriage as defined in claim 1, wherein said pair of guard rails of said seat assembly are padded for comfort of the multiple childred leaning forwardly thereon.

15. The carriage as defined in claim 1, wherein said seat portion of said seat assembly is padded for comfort of the multiple children seated thereon.

* * * * *